United States Patent
Forbes et al.

(10) Patent No.: US 8,308,105 B2
(45) Date of Patent: Nov. 13, 2012

(54) AIRCRAFT ENGINE PYLON ATTACHMENT

(75) Inventors: Alistair Forbes, Bristol (GB); Kenneth Cox, Bristol (GB)

(73) Assignee: Airbus Operations Limited, Bristol (GB)

( * ) Notice: Subject to any disclaimer, the term of this patent is extended or adjusted under 35 U.S.C. 154(b) by 239 days.

(21) Appl. No.: 12/734,233

(22) PCT Filed: Nov. 19, 2008

(86) PCT No.: PCT/GB2008/051087
§ 371 (c)(1),
(2), (4) Date: Apr. 20, 2010

(87) PCT Pub. No.: WO2009/066103
PCT Pub. Date: May 28, 2009

(65) Prior Publication Data
US 2010/0314491 A1    Dec. 16, 2010

(30) Foreign Application Priority Data

Nov. 21, 2007   (GB) .................................. 0722772.1

(51) Int. Cl.
*B64D 27/00*    (2006.01)
(52) U.S. Cl. ........................................ 244/54; 244/53 R
(58) Field of Classification Search .................... 244/54, 244/75 A, 53 R, 55, 137.4
See application file for complete search history.

(56) References Cited

U.S. PATENT DOCUMENTS

| 3,848,832 | A | 11/1974 | Stanley et al. |
| 4,785,625 | A | 11/1988 | Stryker et al. |
| 5,054,715 | A | 10/1991 | Hager et al. |
| 7,997,527 | B2* | 8/2011 | Lafont ............................ 244/54 |
| 2005/0151008 | A1* | 7/2005 | Machado et al. ............... 244/54 |
| 2010/0193627 | A1* | 8/2010 | Lafont ........................... 244/54 |

FOREIGN PATENT DOCUMENTS

| FR | 2 891 247 | 3/2007 |
| GB | 2 021 696 | 12/1979 |

OTHER PUBLICATIONS

International Search Report for PCT/GB2008/051087, mailed Apr. 15, 2009.
Written Opinion of the International Searching Authority for PCT/GB2008/051087, mailed Apr. 15, 2009.
UK Search Report for GB 0722772.1, dated Mar. 7, 2008.

* cited by examiner

*Primary Examiner* — Christopher P Ellis
*Assistant Examiner* — Medhat Badawi
(74) *Attorney, Agent, or Firm* — Nixon & Vanderhye P.C.

(57) ABSTRACT

An aircraft engine mounting structure comprising a pylon box having an upper surface and at least one attachment element configured to be attached to a front spar of an aircraft wing box, the front spar having a lower surface, the attachment element being configured to attach the rear face of the pylon box to the front spar such that at least a portion of the upper surface of the pylon box lies above the lower surface of the front spar.

7 Claims, 4 Drawing Sheets

AIRCRAFT ENGINE PYLON ATTACHMENT

This application is the U.S. national phase of International Application No. PCT/GB2008/051087 filed 19 Nov. 2008, which designated the U.S. and claims priority to GB Application No. 0722772.1 filed 21 Nov. 2007, the entire contents of each of which are hereby incorporated by reference.

BACKGROUND TO THE INVENTION the continuing need to increase fuel efficiency and reduce emissions and noise in commercial transport aircraft has driven the increasing use of high bypass ratio turbo-fan engines. As appreciated by those skilled in the art, as the bypass ratio of the engine increases, so does their overall diameter. For under-wing mounted power plants, the large fan diameter necessitates either increasing the landing gear length to provide the necessary ground clearance, this option being undesirable due to the resulting increased weight and integration of problems of the longer landing gear, or to mount the engine closer to the wing.

Traditional under-wing engine mounting methodologies involve mounting the engine pylon to the lower surface of the wing. However, as the overall diameter of the turbo-fan engines has increased this methodology is approaching its limit in terms of the vertical separation provided between the engine and the lower surface of the wing, such that further fan diameter increases are becoming increasingly difficult to accommodate without compromising the overall aircraft configuration in terms of either the landing gear length or wing dihedral.

SUMMARY OF THE INVENTION

According to a first aspect of the present invention there is provided an aircraft engine mounting structure comprising a pylon box having an upper surface and at least one attachment element configured to be attached to a front spar of an aircraft wing box, the front spar having a lower surface, the attachment element being configured to attach the rear face of the pylon box to the front spar such that at least a portion of the upper surface of the pylon box lies above the lower surface of the front spar.

The aircraft engine mounting structure preferably comprises at least one attachment element located towards either the upper or lower surface of the pylon box and a plurality of attachment elements located respectively towards the opposing pylon box surface, at least one of said attachment elements being configured to react lateral loadings. Additionally, one of the attachment elements may comprise a pinned link, whereby said attachment element is isolated from lateral loadings.

Additionally or alternatively, the aircraft engine mounting structure may further comprise a further attachment element including a first bracket arranged to be attached to the rear face of the pylon box, a second bracket arranged to be attached to the wing box front spar and a connecting element arranged to connect together the first and second brackets, wherein the first and second brackets are arranged to be vertically displaced from one another such that the further attachment element is configured to react vertical loadings. Additionally, the connecting element may be connected to the first and second brackets by a pinned link, whereby the further attachment element is isolated from fore/aft loadings.

Additionally or alternatively, the aircraft engine mounting structure may further comprise a longitudinal strut arranged to be connected between the pylon box and wing box.

The aircraft engine mounting structure preferably comprises a plurality of said attachment elements such that said structure is statically determinate.

The or each attachment element may comprise a separate component arranged to be attached to one of the pylon box and wing box. Alternatively, the or each attachment element may be integrally formed with a respective one of the pylon box and wing box and may comprise a non-metallic composite material.

DESCRIPTION OF EMBODIMENTS OF THE INVENTION

Figure 1:
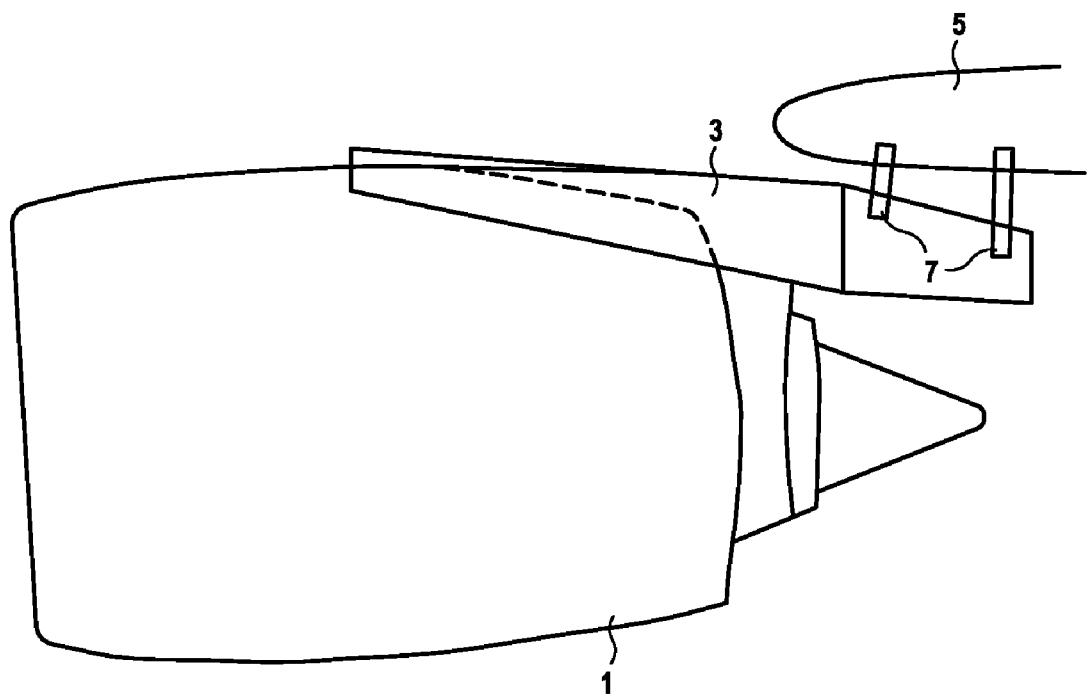
FIG. 1 schematically illustrates a traditional under-wing high bypass engine mounting.

FIG. 1 schematically illustrates the method of engine pylon attachment according to the prior art. A high bypass ratio gas turbine engine 1 is attached substantially at a first end of a mounting pylon 3 in a conventional manner. The other end of the pylon 3 is attached to the lower surface of the aircraft wing profile 5 by means of a conventional attachment links 7. An example of suitable attachment links include thrust and pitch bars having a known arrangement. As previously noted, the arrangement shown in FIG. 1 is such that there is little scope for a further increase in the overall diameter of the gas turbine 1, since to accommodate an increase in diameter without corresponding increase in the length of the landing gear would require the gas turbine 1 to be brought even closer to the under surface of the wing 5. Ultimately, this movement is physically limited since clearly at some point the outer surface of the gas turbine itself will come into contact with the lower surface of the wing profile 5. In fact, there must be a minimum separation maintained between the lower surface of the aircraft wing and the gas turbine.

Figure 2:
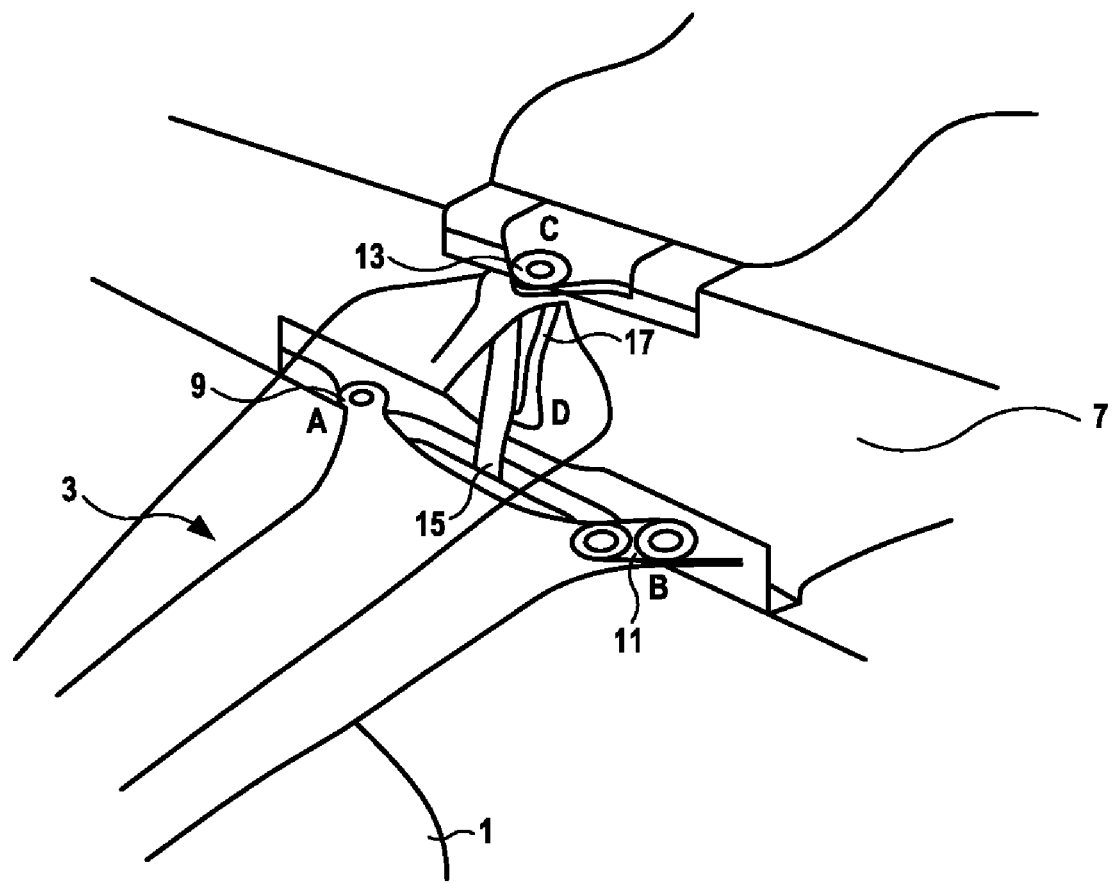
FIGS. 2 and 3 schematically illustrate a pylon attachment according to a first embodiment of the present invention.
Figure 3:
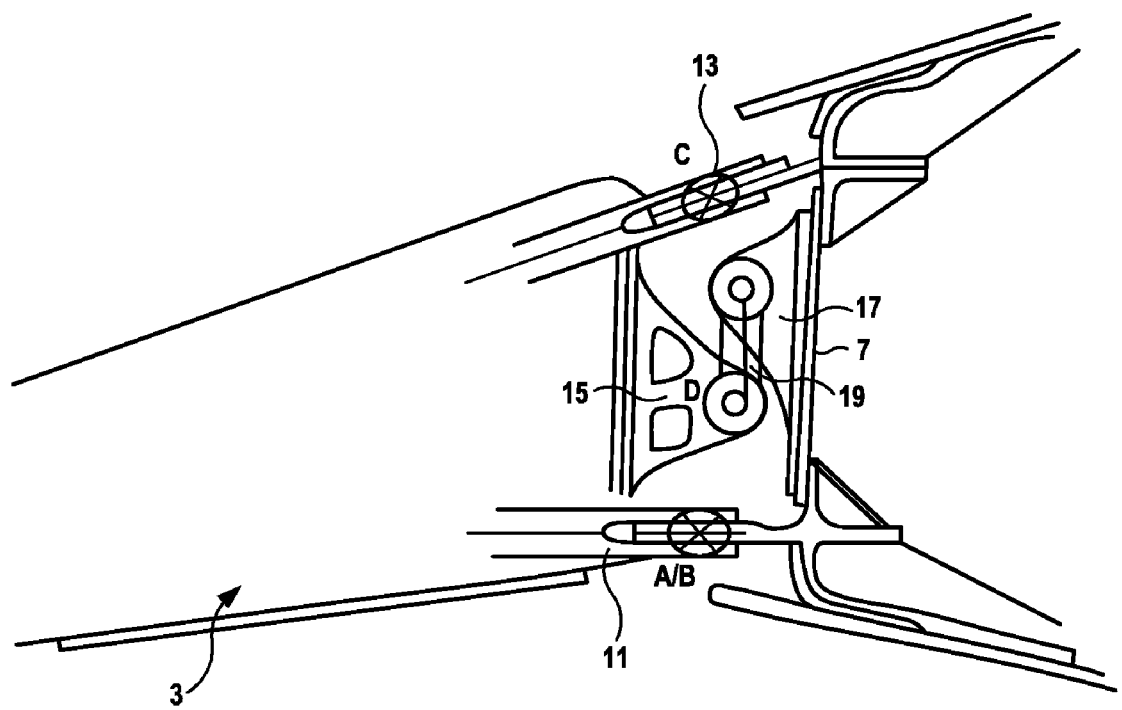

FIGS. 2 and 3 schematically illustrate a pylon attachment arrangement according to a first embodiment of the present invention. The engine mounting primary pylon 3 comprises a pylon box arranged to be attached directly to the front spar 7 of the aircraft wing box. A first pair of attachment lugs 9, 11 are located at the rear of the lower panel of the pylon box 3 and are arranged to be attached to corresponding lugs on the wing box front spar. A first one of the lower lugs 9 is arranged to be attached directly to the wing box by conventional means, whilst the second lower lug 11 is arranged to be attached to its respective wing box lug via a pinned link orientated in the fore/aft direction. The pinned link provides additional functionality of isolating the attachment from transferring lateral loads. It will of course be appreciated that either one of the two lower lugs may be arranged to be attached to the wing box via the pinned link. The lower two attachment lugs 9, 11 are capable of reacting in yaw moments imparted on the aircraft wing box by the engine 1 through a differential fore/aft load. An upper attachment lug 13 is provided at the rear of the upper panel of the pylon box 3 and is arranged to be directly attached to a corresponding lug on the upper portion of the inbox front spar. In preferred embodiments of the present invention the upper attachment lug 13 is located on the centre line of the pylon box 3. Any pitch moments imparted on the wing box by the engine is reacted through differential fore/aft loadings in the upper and lower attachments of the pylon box.

All three of the upper and lower attachment points 9, 11, 13 are capable of reacting the thrust loadings imparted from the engine. Any roll moments are reacted through differential lateral loads in the three upper and lower attachments. These attachments are also capable of reacting the lateral loadings from the engine. Vertical loads are reacted by an additional attachment bracket 15 located on the rear vertical panel of the pylon box and which is connected to a corresponding, vertically displaced, bracket 17 formed on the wing box front spar via a short elongate pinned link 19.

In the embodiment of the present invention described above the various attachment lugs and brackets allow 6 independent loads to be reacted corresponding to the 6 degrees of freedom (fore/aft, lateral, vertical, yaw, roll and pitch) and the overall attachment arrangement of the pylon box to the wing box is considered to be statically determinate. A structure or mechanical configuration is considered statically determinate when the static equilibrium equations are sufficient to determine the internal forces and reactions on that structure. In other words, the statically determinate nature of the attachment configuration of the embodiment of the present invention described above allows all the internal forces and reactions experienced by the pylon box and wing box to be calculated and therefore the required strength of materials can be determined. Whilst this is preferable it is not an absolute requirement. For example, in a further embodiment of the present invention both of the lower attachment lugs 9, 11 of the pylon box may be arranged to be directly connected to their respective corresponding lugs on the front spar of the wing box i.e. neither attachment point uses a pinned link. Whilst this has the benefit of reducing the lateral loads exerted on the lower attachments and the upper attachment point 13, since both lower attachment points 9, 11 are capable of reacting 2 degrees of freedom (fore/aft and lateral loads), it has the disadvantage that the number of independently reacted loads is increased to 7 and therefore the arrangement is no longer statically determinate.

Figure 4:
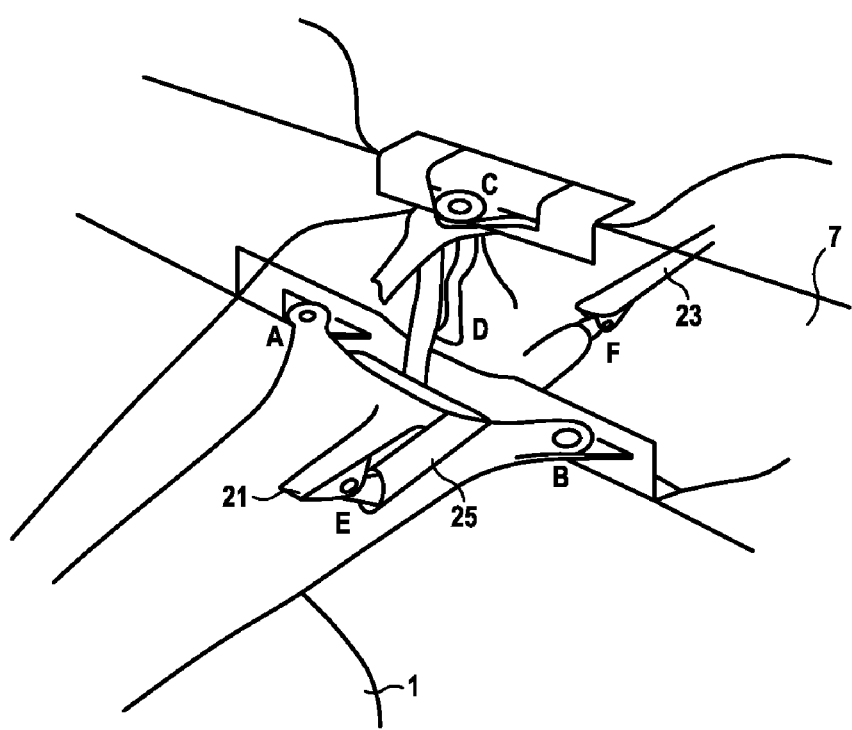
FIGS. 4 and 5 schematically illustrates a pylon attachment according to a second embodiment of the present invention.
Figure 5:
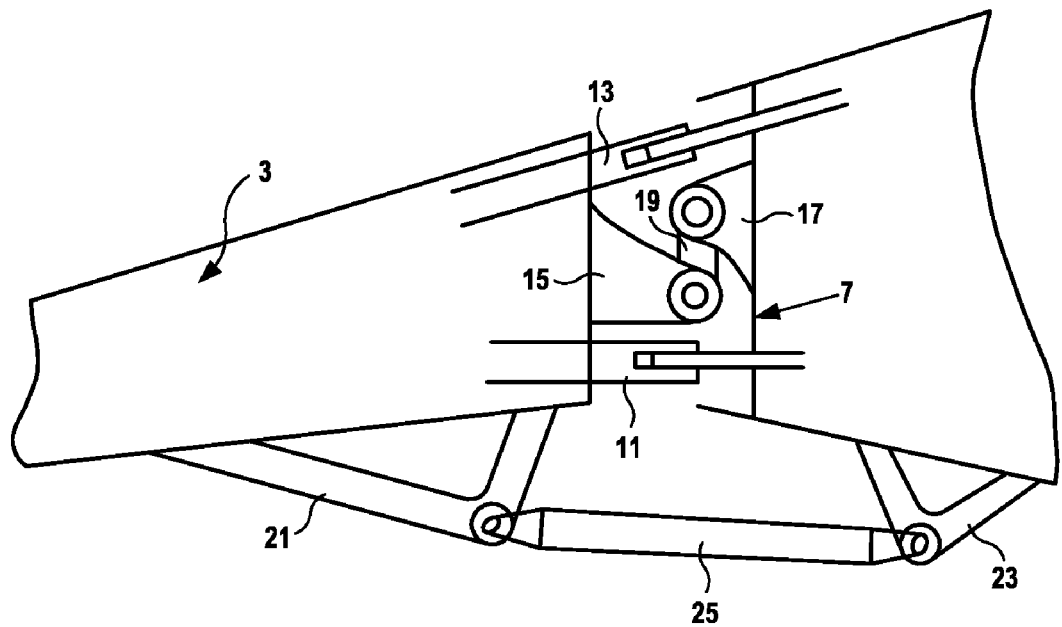

A further embodiment of the present invention is schematically illustrated in FIGS. 4 and 5. The same arrangement of two lower attachment lugs 9, 11 and a single, preferably central, attachment point 13, together with the vertically orientated pinned link 19 are provided in an analogous manner to the previously described embodiments. Additionally, a first bracket 21 is mounted on the lower surface of the pylon box 3. A corresponding second bracket 23 is mounted on the lower skin of the aircraft wing box 7. Both lower brackets 21, 23 are preferably A-frame structures but alternative bracket arrangements may equally be provided. An elongate strut 25 is pin jointed at one end to the mounting bracket 21 on the lower surface of the pylon box and its opposite end is pin jointed to the second mounting bracket 23 provided on the lower skin of the wing box. The strut 25 significantly reduces the magnitude of the load input at the lower and upper lugs 9, 11, 13 exerted by pitching moments from the engine 1.

In all embodiments of the present invention, and as best illustrated in FIGS. 3 and 5, the pylon box 3 is in the same plane as the front spar 7 of the aircraft wing box at the point of attachment of the pylon box to the aircraft wing box. Consequently, the transfer of the loads exerted by the engine on the pylon box occurs in the same plane, which is mechanically advantageous. In all embodiments of the present invention the attachment lugs and brackets may be formed as discrete components from a suitable engineering material, such as a non-metallic composite or an engineering metal or metal alloy and attached to the pylon box and wing box respectively by appropriate known methods. Alternatively, one or more of the respective attachment lugs and brackets may be formed integrally with the respective wing box or pylon box at the time of manufacture.

The invention claimed is:

1. An aircraft engine mounting structure comprising:
a pylon box having an upper and a lower surface, a first attachment element located towards either the upper or lower surface of the pylon box, and second and third attachment elements located respectively towards the opposing pylon box surface,
wherein each of said first, second and third attachment elements is configured to be attached to a front spar of an aircraft wing box, the front spar having a lower surface, said first, second and third attachment elements being configured to attach a rear face of the pylon box to the front spar such that at least a portion of the upper surface of the pylon box lies above the lower surface of the front spar,
wherein at least one of said first, second and third attachment elements is configured to react lateral loadings and another one of said first, second and third attachment elements comprises a pinned link configured to be isolated from lateral loadings, whereby said structure is statically determinate.

2. The aircraft engine mounting structure of claim 1 further comprising a fourth attachment element including a first bracket arranged to be attached to the rear face of the pylon box, a second bracket arranged to be attached to the wing box front spar and a connecting element arranged to connect together the first and second brackets, wherein the first and second brackets are arranged to be vertically displaced from one another such that the fourth attachment element is configured to react vertical loadings.

3. The aircraft engine mounting structure of claim 2, wherein the connecting element is connected to the first and second brackets by a pinned link, whereby the fourth attachment element is isolated from fore/aft loadings.

4. The aircraft engine mounting structure of claim 1 further comprising a longitudinal strut arranged to be connected between the pylon box and wing box.

5. The aircraft engine mounting structure of claim 1, wherein one or more of the first, second and third attachment elements each comprise a separate component arranged to be attached to one of the pylon box and wing box.

6. The aircraft engine mounting structure of claim 1, wherein one or more of the first, second and third attachment elements is integrally formed with a respective one of the pylon box and wing box.

7. The aircraft engine mounting structure of claim 6, wherein one or more of the first, second and third attachment elements comprises a non-metallic composite material.

* * * * *